United States Patent [19]  
Taylor

[11] 3,901,752  
[45] Aug. 26, 1975

[54] LAMINATING PROCESS UTILIZING MIXTURES OF PYROLYZABLE AND POLYMERIZABLE BINDERS

[75] Inventor: Lynn J. Taylor, Haslett, Mich.

[73] Assignee: Owens-Illinois, Inc., Toledo, Ohio

[22] Filed: Mar. 8, 1973

[21] Appl. No.: 339,166

Related U.S. Application Data

[63] Continuation-in-part of Ser. No. 189,449, Oct. 14, 1971, Pat. No. 3,816,162.

[52] U.S. Cl. .................. 156/155; 156/309; 264/29; 427/228
[51] Int. Cl.² ...................... B32B 31/20; C09J 5/06
[58] Field of Search ...... 117/46 CA, 46 CC, 46 PA; 156/155, 306, 309; 264/29; 423/447

[56] References Cited
UNITED STATES PATENTS

| | | | |
|---|---|---|---|
| 3,039,897 | 6/1962 | Waring et al. ...................... 117/226 |
| 3,419,412 | 12/1968 | Morris et al. ......................... 117/38 |
| 3,697,345 | 10/1972 | Vaughan et al. ..................... 156/155 |
| 3,775,078 | 11/1973 | Elmer et al. ............................. 65/32 |

Primary Examiner—Douglas A. Drummond  
Assistant Examiner—Robert A. Dawson  
Attorney, Agent, or Firm—Donald Keith Wedding

[57] ABSTRACT

There is disclosed the in situ synthesizing of a polymeric material on a substrate by applying to the substrate a solid pyrolyzable binder which contains at least one member capable of polymerizing at or above the pyrolysis temperature of the binder and then applying heat so as to pyrolyze the binder and synthesize the polymer such that the pyrolyzed binder is not a part of the in situ synthesized polymeric material.

7 Claims, No Drawings

LAMINATING PROCESS UTILIZING MIXTURES OF PYROLYZABLE AND POLYMERIZABLE BINDERS

RELATED APPLICATION

This is a continuation-in-part of copending United States patent application Ser. No. 189,449, filed Oct. 14, 1971 and now U.S. Pat. No. 3,816,162.

BACKGROUND OF THE INVENTION

This invention relates to the applying of a polymeric material to a substrate for purposes of a decorative or protective coating, adhesion, etc.

The use of chemically reactive coating and adhesive compositions is well known in the prior art. Typically, a liquid coating composition containing such materials is applied to a substrate, allowed to dry, and subsequently heated to form a continuous coating by polymerization in situ.

The use of film-forming organic polymers in adhesive tapes is also well known. Typically, a tape based on an organic polymer, which may optionally contain modifying additives to make the surface tacky, is attached to one or more substrates with the aid of pressure. In this case, no chemical conversion takes place and the film-forming polymer simply remains an integral part of the coating or adhesive structure.

The use of chemically reactive organic materials in connection with continuous adhesive bonding tapes and films is also well known in the prior art. In particular, reference is made to U.S. Pat. No. 3,449,280 to Frigstad and U.S. Pat. No. 3,379,561 to Manaka. In the former disclosure, an epoxy resin and curing agent are incorporated into a high-molecular weight polyamide. The latter disclosure describes the preparation of an adhesive film by coating the surface of a polyamide film with an epoxy resin, a phenolic resin also being present in the polyamide film or in the epoxy resin. In both cases the resulting films are intended to undergo chemical conversion upon heating, but the film-forming (polyamide) resin remains a part of the cured composition and/or participates in the curing reaction.

In accordance with the practice of this invention, a polymeric material is applied to a substrate by means of a binder substance which does not remain a part of the cured polymeric composition and/or participate in the curing reaction.

More particularly, in accordance with the practice of this invention a polymeric material is applied to at least one substrate by means of a pyrolyzable binder and an in situ polymer synthesis.

Still more particularly, there is provided a process of in situ synthesizing a polymeric material on at least one substrate which comprises applying to the substrate a solid pyrolyzable binder which contains at least one member capable of polymerizing at or above the pyrolysis temperature of the binder, and then applying heat so as to pyrolyze the binder and synthesize the polymer such that the pyrolyzed binder is not a part of the in situ synthesized polymeric material.

Thus in the present invention, a thermally removable polymer is used as a binder for one or more monomers or prepolymers. Since this binder is not present in the final polymerized coating on the substrate, the composition of the final coating is determined entirely by the choice of monomeric or oligomeric reactants, and a wide variety of such reactants may be utilized.

In accordance with the practice of this invention, there is utilized a binder capable of pyrolyzing in any suitable environment, in the presence or absence of an oxidizing agent.

As used herein, "pyrolyzing" is defined as the decomposition of the binder to gaseous products without passing through a broad liquid range and without leaving a noticeable carbonaceous or other like residue which would interfere with the intended function of the in situ synthesized polymer.

The polymeric binder is one which will pyrolyze, as distinguished from vaporization, when appropriate energy is applied thereto at some predetermined energy level.

Energy level, as used herein, is intended to include any reasonably measurable molecular energy state which is related to the pyrolyzing of the binder and also the synthesizing of the polymer. The most obvious energy level is temperature, which has been defined as the average molecular kinetic energy. Hereinafter, temperature level will be used as a synonym for energy level. However, the invention is not limited to temperature level alone, but is intended to include any molecular energy level or state which can be obtained by any appropriate energy from any source or means, such as chemical, electrical, thermal, mechanical, sonic, etc. Likewise, the energy can be transmitted in any suitable form such as by electromagnetic radiation, visible or invisible, e.g., infra-red, ultra-violet, x-rays, gamma rays, and beta rays.

The pyrolyzable binder, when solvent-free, is solid under the conditions of handling, e.g., typically room or factory temperatures ranging from about 40°F. to about 120°F. However, more extreme temperatures are contemplated if the conditions of handling so warrant.

The binder is typically selected from one or more pyrolyzable solid polymers or copolymers such as high MW polyethers including polyoxymethylene, poly(tetrahydrofuran), poly(1,3-dioxolane), and poly(alkylene oxides), especially poly(ethylene oxide) or poly (propylene oxide); poly(alkyl methacrylates) including those where the alkyl contains one to six carbons, especially poly(methyl methacrylate), poly(ethyl methacrylate), and poly(n-butyl methacrylate); methacrylate copolymers including methyl methacrylate/n-butyl methacrylate copolymers, methyl methacrylate/alpha-methyl styrene copolymers, n-butyl methacrylate/alpha-methyl styrene copolymers, methyl methacrylate/styrene copolymers, methyl methacrylate/dimethyl itaconate copolymers; and other selected polymers and copolymers including polyisobutylene; poly(trimethylene carbonate); poly (beta-propiolactone); poly(delta-valerolactone); poly(ethylene carbonate); poly(propylene carbonate); poly(ethylene oxalate); vinyl toluene/alpha-methylstyrene copolymers; styrene/alpha-methylstyrene copolymers; cellulose ethers, and olefin-sulfur dioxide copolymers.

In one specific embodiment hereof, there is used a polymeric binder material having oxygen atoms selectively incorporated in its molecular chain, as, for example, peroxy linkages in the chain. Such a pyrolyzable polymer is disclosed in copending U.S. patent application Ser. No. 653,020, filed July 13, 1967, now U.S. Pat. No. 3,632,365, by Dr. Don N. Gray and assigned to the same assignee as that of the instant patent application. Typically there is used a copolymer, terpolymer, or quadpolymer of oxygen and at least one monomer of alkyl methacrylate with the alkyl containing one to six carbon atoms, e.g., methyl to hexyl, preferably butyl. Copolymers of oxygen with other vinyl monomers may also be utilized.

The common characteristic of the selected polymeric binder material is that it must be solid at ambient temperature and pyrolyzable at an elevated temperature, e.g., about 250°C. to about 450°C.

This pyrolysis mechanism of removal of the composition of the invention is of great advantage in non-oxygen-containing atmospheres, but the compositions may also be used in an oxygen-containing atmosphere. This characteristic permits the use of a continuum of atmospheric pressures downward from somewhat less than 14.7 lbs. per sq. in. absolute to vacua approaching the micron range. Likewise, inert environments such as nitrogen, argon, etc. may be used.

Examples of suitable polymerizable members include:

difunctional, trifunctional and polyfunctional organic amines, including p-phenylenediamine, m-phenylenediamine, benzidine, 4,4'-methylenedianiline, 4,4'-oxydianiline, 4,4'-thiodianiline, 3,3',4,4'-tetraaminobiphenyl, 4,4'-methylenebis(o-chloroaniline), hexamethylenediamine, ethylenediamine, 1,2-diaminopropane, 1,3-diaminopropane, 1,4-diaminoanthraquinone, 2,4-diaminoanthraquinone, melamine, 1,4-cyclohexanediamine, 4,4'-diaminostilbene, and 4,4'-diaminodiphenyl sulfone;

difunctional, trifunctional, and polyfunctional organic carboxylic acids, including adipic acid, sebacic acid, azelaic acid, "dimer acid," phthalic acid, isophthalic acid, biphenyldicarboxylic acid (various isomers), trimellitic acid, pyromellitic acid, "trimer acid," benzophenone-3,3'4,4'-tetracarboxylic acid, 1,8,4,5-naphthalenetetracarboxylic acid, and 2,3,6,7-anthraquinonetetracarboxylic acid;

organic anhydrides including phthalic anhydride, maleic anhydride, succinic anhydride, pyromellitic dianhydride, benzophenone 3,3'4,4'tetracarboxylic acid dianhydride, 1,8,4,5-naphthalene tetracarboxylic acid dianhydride, and 2,3,6,7-anthraquinonetetracarboxylic acid dianhydride;

difunctional, trifunctional, and polyfunctional esters, including dimethyl azelate, dimethyl sebacate, diethyl adipate, dimethyl terephthalate, diphenyl terephthalate, diphenyl isophthalate, and bis(2-hydroxyethyl)-terephthalate;

difunctional, trifunctional, and polyfunctional organic isocyanates including hexamethylene diisocyanate, toluene diisocyanate (various isomers), xylene diisocyanate (various isomers), diphenylmethane-4,4'-diisocyanate, and suitably "blocked" derivatives of the above;

difunctional, trifunctional, and polyfunctional alcohols and phenols, including 1,4-cyclohexanediol, p-xylene-α,α'-diol, hydroquinone, catechol, resorcinol, 2,2-bis(p-hydroxyphenyl)propane, p,p'-biphenol, 1,1,1,-trimethylolpropane, and pentaerythritol;

difunctional, trifunctional, and polyfunctional organic acyl halides, including adipyl chloride, sebacyl chloride, azelaoyl chloride, and terephthaloyl chloride;

difunctional, trifunctional, and polyfunctional hydrazides, including adipic acid dihydrazide, azelaic acid dihydrazide, sebacic acid dihydrazide, and terephthalic acid dihydrazide;

and other materials such as diphenyl carbonate and terephthalaldehyde.

Examples of polymerizable members also include prepolmers:

Epoxy Resins; Urea-Formaldehyde Resins; Phenol-Formaldehyde Resins; Melamine-Formaldehyde Resins; Furan Resins; Polyanhydrides; Polyhydrazides; low molecular weight polyethers; low molecular weight polyesters; and Silicone Resins.

In addition to the monomer and/or prepolymer, the pyrolyzable binder may be loaded with other suitable ingredients providing such do not interfere with the pyrolysis and/or polymerization process.

Suitable ingredients contemplated include fillers, pigments, reinforcing agents, colorants, stabilizers, glass fibers, carbon black, plasticizers, catalysts, initiators, etc.

In one preferred embodiment hereof, the solid pyrolyzable binder and polymer forming material (monomer or prepolymers), including any additionally loaded ingredients, are prepared in the form of a chemically convertible tape.

In the practice of such embodiment, it is contemplated that the chemically convertible tape will ordinarily be prepared by casting from a solution containing the thermally removable binder, one or more volatile solvents for that binder, and the monomer(s) or prepolymer(s), which may or may not be soluble in the solvent or solvent mixture.

Other methods of preparing the chemically convertible tape are also contemplated. These include tape formation by extrusion, or calendering of suitable compositions containing molten polymeric binder, as well as casting from a suitable dispersion or emulsion in aqueous media. Fabrication of the tape by impregnation or coating of a previously prepared film of pyrolyzable binder is also contemplated.

In the application of this invention, a surface to be coated is covered with a film or tape which contains a material or combination of materials which can be converted by heating into a suitable coating or adhesive material. Subsequent heating leads to the initiation of chemical reactions leading to the formation of a coating (or interlayer) of a suitable (polymeric) material.

Such a tape or film would typically consist of at least two components: a film-forming "binder" of high molecular weight and one or more "reactive components," which would ordinarily be materials of low molecular weight.

Depending upon the choice of reactive components, various types of polymer materials can be prepared in situ according to this invention. Specific embodiments would involve the use of the following types of reactive components.

1. An epoxy resin and a curing agent such as an amine or anhydride;

2. A diamine and a dianhydride, which upon heating will react to form a polyimide;

3. Two materials capable of reacting to form a polyurethane, such as a "blocked isocyanate" and a polyether or polyester;

4. A phenolic resin, with or without added curing catalysts;

5. A melamine-formaldehyde or urea-formaldehyde resin, with or without added curing catalysts.

It is envisioned that, in most cases, the reactive components will be intimately mixed with the binder (e.g., by dispersing or dissolving the reactive components in a solution of the binder, then casting a film from the resulting mixture). However, it would also be possible to apply a reactive component as a coating on the surface of a film of "binder," or to "sandwich" reactive components between two layers of binder. In certain cases involving two or more reactive components, it may be necessary or desirable to have each of the reactive components present in a separate layer of a tape consisting of two or more layers.

As already noted, fillers, reinforcing agents, colorants, and other additives (e.g., glass fibers, carbon black, pigments, stabiliziers, etc.) may also be incorporated in the tape; these will be present as such in the final coating provided they are not destroyed by heating or by interaction with other materials present.

The compositions of this invention may also be used for adhesive bonding purposes. For example, a layer of pyrolyzable binder containing a polymerizable organic member may be "sandwiched" between two surfaces, and the resulting sandwich structure may then be heated, in order to remove the pyrolyzable binder and to cause polymerization of the polymerizable member. The two substrates may be of any suitable geometric shape, and may be of the same or different materials. This adhesive bonding method is particularly suitable for use with substrates which are resistant to heat, such as glass, ceramic, glass-ceramic, and metal substrates.

In comparison to the conventional methods of applying chemically convertible coating materials as liquid "paints," the following advantages are anticipated by the practice of this invention:

1. Increased convenience of handling and application to surfaces;

2. Storage stability over prolonged periods, without the need for storage in closed containers;

3. In some instances, the need for running pre-polymerizations ("B-staging") can be eliminated;

4. Disadvantages inherent in the use of solvent-based coatings (solvent cost, fire and health hazards, air pollution, etc.) can be avoided; and 5. Mixing of reactive components just prior to the coating process is avoided.

The following EXAMPLES represent some of the best embodiments contemplated by the inventor in the practice of this invention.

EXAMPLE 1

A mixture of 3 grams (g.) olefin-sulfur dioxide copolymer ("QX-3618", Dow Chemical Co.), 15 g. xylene, 15 g. n-butanol, and 3 g. commercially available urea-formaldehyde resin solution (Beckamine P-138-60, Reichhold Chemical Co., 60% resin solids in xylene/butanol) is prepared and agitated until homogeneous.

A tape is prepared from a portion of the resulting solution, by casting onto a polytetrafluoroethylene substrate. After evaporation of volatiles, a piece of the resulting tape is placed on a glass substrate and heated 3 hours in air at ca. 300°–350°F. An adherent, continuous, yellowish coating is formed. An acetone-wipe test indicates that the curing of the coating is substantially complete.

The Dow Chemical Company "QX-3618" is an alpha-olefin/sulfone copolymer having a softening temperature of 50°C. to 60°C., a polymer melt temperature of 135°C. to 145°C., and a decomposition initiation temperature of about 175°C. It is soluble in ketones and chlorinated solvents such as methylene chloride and ethylene chloride. After 5 minutes at 240°C., about 99.3 percent is converted to volatile products. It exhibits a strong IR band at 720/cm, 1,110/cm, and 1,300/cm.

EXAMPLE 2

To a solution of 20 grams (g.) polyisobutylene in 180 milliliters (ml.) benzene, there is added 10.9 g. pyromellitic dianhydride, 9.9 g. 4,4'-methylene-dianiline, and about 10 g. chlorinated biphenyl plasticizer (Monsanto Aroclor 1242). The resulting mixture is agitated until substantially homogeneous. A portion of the resulting mixture is cast onto a polytetrafluoroethylene substrate, and allowed to dry. A portion of the resulting tape is placed on a glass substrate and heated 2 hours at about 400°F., then 6 hours at about 700°F. A brown polymeric coating, substantially insoluble in N,N-dimethylformamide, is formed.

I claim:

1. A process for bonding two or more surfaces together, which process comprises
    applying to a first surface a composition which consists essentially of a solid pyrolyzable polymeric binder, a solvent for the binder, and at least one polymerizable organic member,
    contacting the composition containing first surface with a second surface so as to form a laminate-like structure,
    and heating the structure so as to remove the pyrolyzable binder and synthesize in situ a polymeric material, said material acting as an adhesive such that the surfaces are bonded together.

2. The process of claim 1, wherein the pyrolyzable binder is selected from polyethers, poly(alkyl methacrylates), methacrylate copolymers, polyisobutylene, poly(trimethylene carbonate), poly(beta-propiolactone), poly(delta-valerolactone), poly(ethylene carbonate), poly(propylene carbonate), poly(ethylene oxalate), vinyl toluene/alpha-methyl styrene copolymers, styrene/alpha methyl styrene copolymers, cellulose ethers, and olefin-sulfur dioxide copolymers.

3. The process of claim 1, wherein the polymerizable organic member comprises at least one compound selected from polyfunctional organic amines, carboxylic acids, esters, isocyanates, alcohols, phenols, acyl halides, and hydrazides.

4. The process of claim 1, wherein the polymerizable organic member comprises at least one substance selected from epoxy resins, urea-formaldehyde resins, phenol-formaldehyde resins, melamine-formaldehyde resins, furan resins, polyanhydrides, polyhydrazides, polyethers, polyesters, and silicone resins.

5. The process of claim 1, wherein the polymerizable organic member contains at least one organic anhydride or dianhydride.

6. The process of claim 1, wherein the polymerizable organic member is a mixture of an organic diamine and an organic dianhydride.

7. The process of claim 1, wherein the polymerizable organic member is a mixture of a tetrafunctional organic amine and an organic diester.

* * * * *